United States Patent [19]

Hawkins

[11] Patent Number: 4,719,462
[45] Date of Patent: Jan. 12, 1988

[54] RADAR DETECTION HELMET

[76] Inventor: David E. Hawkins, P.O. Box 10333, Knoxville, Tenn. 37939-0333

[21] Appl. No.: 931,729

[22] Filed: Nov. 17, 1986

[51] Int. Cl.$^4$ ............................................. G01S 7/40
[52] U.S. Cl. ..................................... 342/20; 2/2.1 R; 2/6; 455/227
[58] Field of Search ............... 2/2.1 A, 6, 2.1 R; 342/20; 340/901-905, 670, 600; 455/39, 49, 66, 79, 132, 135, 156, 160, 227, 229

[56] References Cited

U.S. PATENT DOCUMENTS

| | | | |
|---|---|---|---|
| 3,088,002 | 4/1963 | Heisig | 2/6 X |
| 3,786,519 | 1/1974 | Aileo | 2/6 |
| 4,315,261 | 2/1982 | Mosher | 342/20 |
| 4,524,461 | 6/1985 | Konstanty et al. | 455/79 |
| 4,626,857 | 12/1986 | Imazeki | 342/20 |

OTHER PUBLICATIONS

Micro-Scan Radar Detector ad; "Cycle" (7/79).

Primary Examiner—T. H. Tubbesing
Assistant Examiner—Bernarr Earl Gregory

[57] ABSTRACT

According with the present disclosure to provide a suitable protective headgear for the sports vehicle operator/motorcyclist that incorporates internal radar detection electronics capable of detecting X and K band radar signals as well as any future bands that may be used. To provide both audio and visual alarm signals that will allow the operator to adjust speed accordingly to avoid violations. To provide the light panel display in the vision proximity of wearer so that the operator never has to look away from their immediate trajectory. To provide ventilation for both the wearer and the electronics inclosed therewith that would compensate for any additional heat caused by the electronic circuitry. Helmets would be sized to fit different size heads with a comfortable snug fit.

13 Claims, 13 Drawing Figures

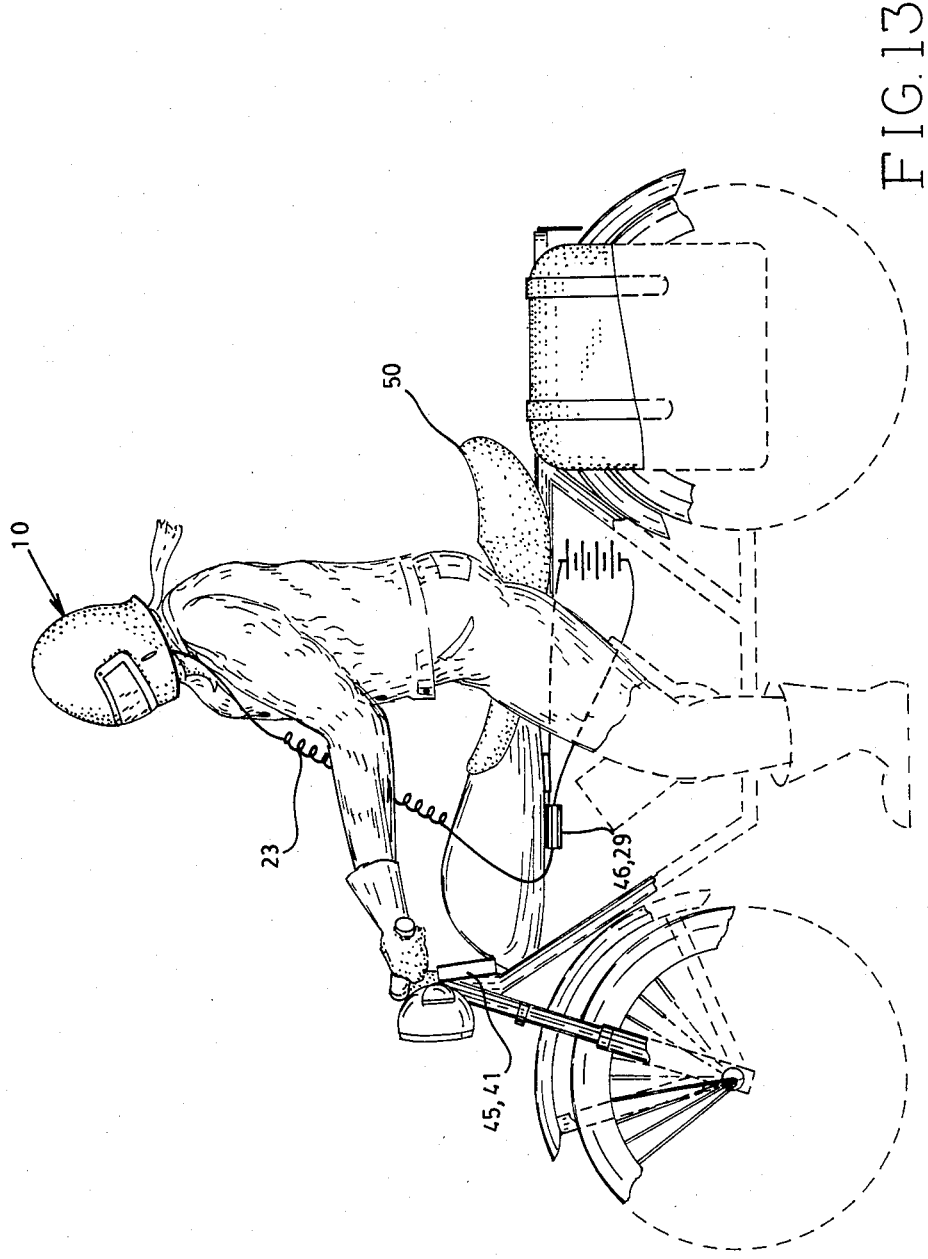

RADAR DETECTION HELMET

BACKGROUND OF THE INVENTION

Helmets have been designed for safety, some providing ventilation, some providing a powered ventilator, some have provided two-way radio conversation electronics, some have provided a microphone and some both microphones and earphones or speakers. Some are open-face helmets and others are full-coverage. Some helmets are multipiece units. None have provided radar-detection electronics incorporated into the helmets. Likewise, radar-detection units are two-fold. There is the directly mounted radar-detector which is not easily seen without altering your field of vision while looking down at the unit itself instead of where you are going. Also, there are the remote mounted units that incorporate a viewer that like the directly mounted units have to be mounted out of the operators field of vision which in turn also requires the operator of said vehicle to alter their field of vision away from their trajectory to look down at the viewer. This is a hazard not only to the operator of said motorcycle or other sports vechicle but also to any passengers aboard and other traffic in the immediate area.

SUMMARY OF THE INVENTION

This invention relates to the motorcycle helmet field with the adaptation of internally orientated electronics to provide the user with radar-detection signals by use of internal lights and sound warning signals.

The primary objective is to provide the operator with radar-detection not currently available. Another object is to provide the rider/driver internal lights and sound activated by the system internally built into the helmet restraint area. By this means the operator never has to take his eyes away from the road area being driven, thus avoiding possible accidents that could and possibly do happen for this reason alone.

Another objective is to provide a comfortable, attractive, functional yet high quality impact resistant helmet to give the best protection available to the wearer if a crash should occur.

Another objective is to provide the sport vehicle/motorcycle operators with radar-detection that would stand less chance of being stolen than the other units previously discussed as the sport vehicle/motorcycle operators generally carry their helmets with them or lock them to their vehicles during stops.

Another objective is to provide extra security for the radar-detection helmet by having no external markings to indicate that the helmet is anything but a regular helmet.

Another objective is to give the motorcycle operator/sports vehicle operator advance warning of radar traps or approaching radar from any direction by both sound and light warning signals.

Another objective of the invention is to provide a radar-detection helmet which incorporates all associated electronics which is simple to manufacture and convenient to use. By making the helmet with the electronics for radar-detection enclosed therein and providing lights and sound all on the interior of the helmet, the operator never has to take his eyes or thoughts away from his immediate trajectory. This in essence reduces risk of accident or injury by allowing full attention forward while giving an advance warning of radar so that one might adjust his speed to avoid possible tickets and fines.

Still another objective is to provide X and K band radar detection not to mention any and all future bands that may be used in radar-units.

BRIEF DESCRIPTION OF THE DRAWINGS

Further features and advantages of the invention will be more readily understood from the following detailed description of a preferred embodiment thereof, given here by way of example only with reference to the accompanying illustrative drawings, where:

FIG. 13 is a side elevational view showing the invention in use with a choice of hook-up for either circuitry used in FIG. 11 or FIG. 12.

DESCRIPTION OF THE PREFERRED EMBODIMENTS

Figure 1:
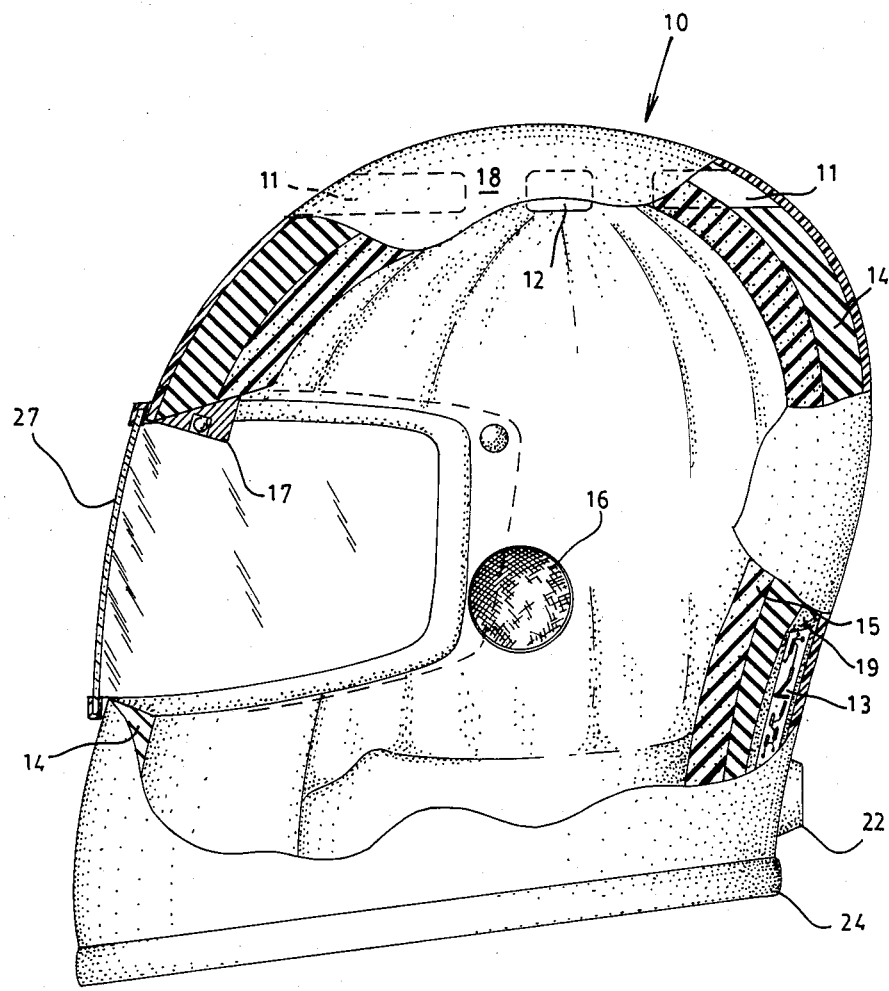
FIG. 1 is a side elevational view, partly in section, of the radar-detection helmet according to the invention.

In the various figures, the same reference numerals pertain to similar elements.

Figure 4:
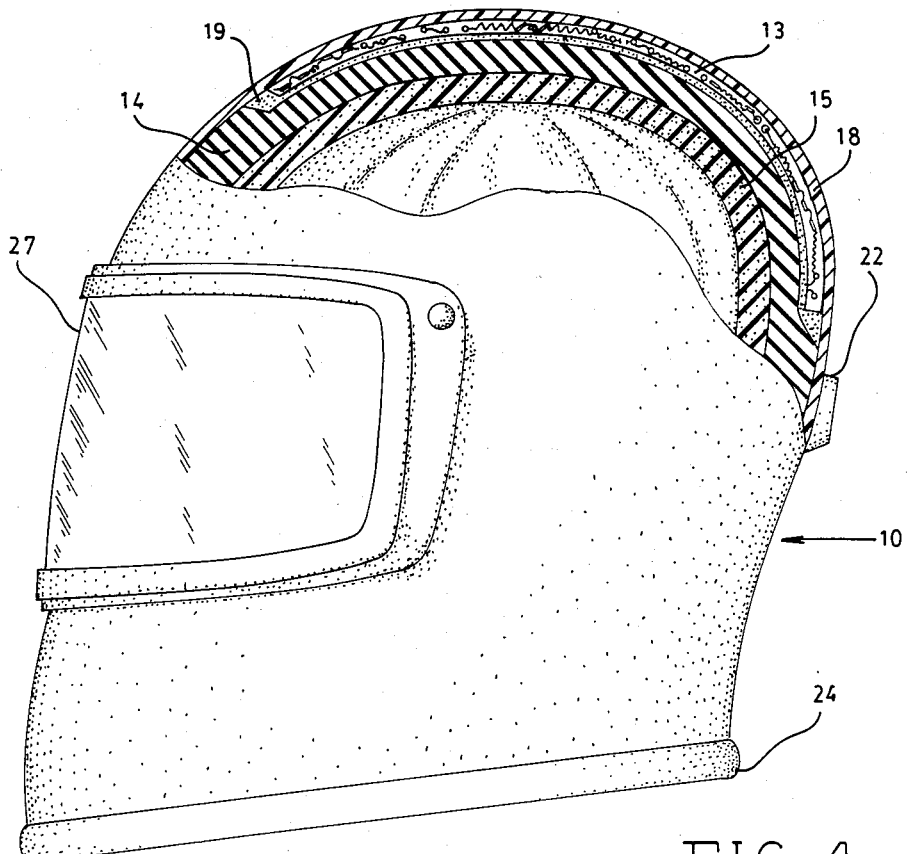
FIG. 4 is a side elevational view, partly in section, in another embodiment of the radar-detection helmet showing primarily the aperture for electronics in the area more to the top and rearward in prespective.
Figure 5:
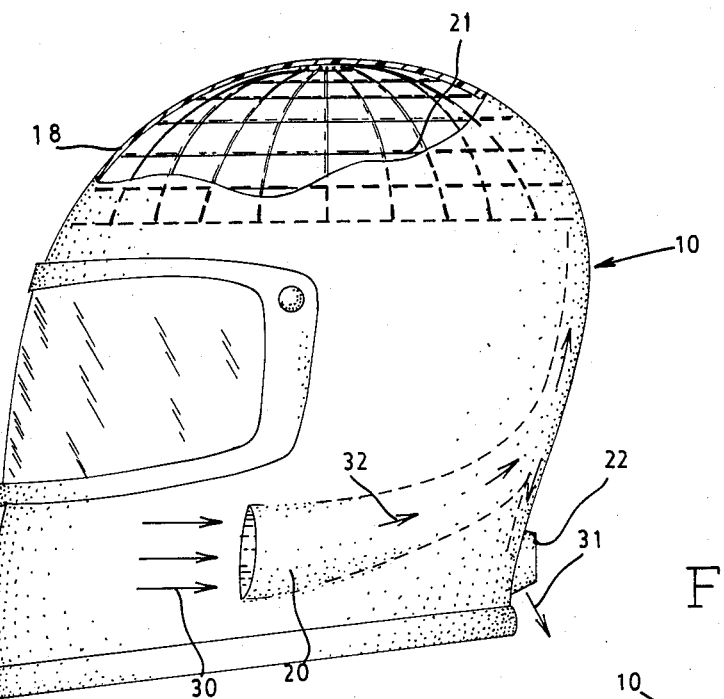
FIG. 5 is a side elevational view, partly in section, in another embodiment of the radar-detection helmet showing primarily the use of a 360 degree antenna in upper-half region or helmet and the air-venting system and directional path thereof.

The radar-detection helmet 10 according to the present invention as shown in FIG. 1 comprises a head cap or shell 18 formed from a rigid material such as fiberglass, graphite composite, high impact plastic or for those versed in the art, any suitable substance able to withstand impacts and qualify under D.O.T. and SNELL STANDARDS or any standard applicable to current and future outlines. The rim of outer shell 18 is provided with an edge beading 24 which may be in rubber, nylon or any other suitable substance. The shell 18 has at the front an opening covered with a moveable and removeable transparent visor 27. The shell 18 is lined inwardly with a shock absorbing material layer 14 such as expanded polystyrene that may be form fitting to shell 18 and provide an aperture 19 to enhouse electronics 13 and space for wiring of control panel 26 including volume control wiring 48, city/highway control wiring 49 and on/off control wiring 51. A further aperture in the layer 14 houses panel display 17 having wiring 36 for power indicator 33 and signal strength indicator lights 34 and 35. The control panel 26 with volume control switch 38, city/highway switch 39 and on/off control switch 40 will be understood by reference to FIGS. 2, 3, 4, 7, 8, 9 and 10. Additionally in another embodiment the battery pack 25 of FIG. 3 will also require an aperture in padding 14 which would be best in a flame retardant material. The crown piece or inner lining 15 is constructed of a lined safety resilient padding forming at the forehead with space allowed for light display panel 17 and moving over the crown of the head down to the areas around the ears allowing for earphones/buzzers 16 then forward to the upper cheek bones of the wearer tapering off at the sides of the frontal opening as illustrated in FIGS. 1, 6, 9 and 10. Also the inner lined cushioning material 15 should be of a flame retardant material and will allow space for battery pack 25 FIG. 3 and control panel 26 with switches 38,39 and 40. However, in each case the lined padded cushioning will be all to come in contact with the wearers' head. Through the use of different sizes of cushioning materials 14 and 15 the helmets will be provided in sizes similar to hat sizes and should present a snug fit on the operators/wearers' head. Additionally, cushioning material 14 and 15 will also allow space for and protection from the radio-frequency waveguides 11 which are front and rear and 12 which are side to side FIG. 1 or the full 360 degree antenna 21 as depicted in FIG. 5.

The radar detection helmet will incorporate an exhaust vent 22 to allow a moderate amount of air to be drawn from the helmet 31 over the electronics for cooling. Likewise, vents 20 will engage incoming air 30 for cooling of electronics and wearer through passage-way 32 FIG. 5 and 6. Vents 20 FIG. 5 and 6 may be provided with a filter from a material in the form of open-cell-foam. Said filter has for purpose to prevent the ingress of dust and water into the radar-detection helmet. It would be advantageous to provide exchangeable filters for cleanliness and moreover provide filters of different densities to correspond to airflow desired. For those versed in the art it would be appreciated that vents 20 and 22 may not be incorporated or may be incorporated in different areas and sized for best cooling of electronics and wearer. Also it will be appreciated that different embodiments may be employed and other suitable substances may be employed to best facilitate construction.

Figures 2, 3:
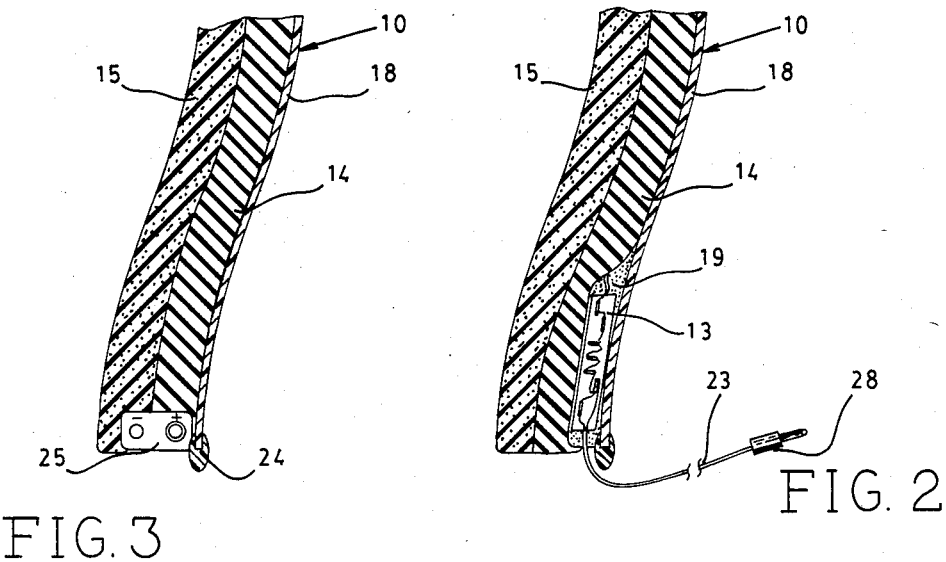
FIG. 2 is a sectional view of the lower rear portion of helmet area showing primarily the aperture for electronics and power-cord.
FIG. 3 is a sectional view of the lower rear portion of helmet area showing primarily the battery pack in another embodiment.
Figure 11:
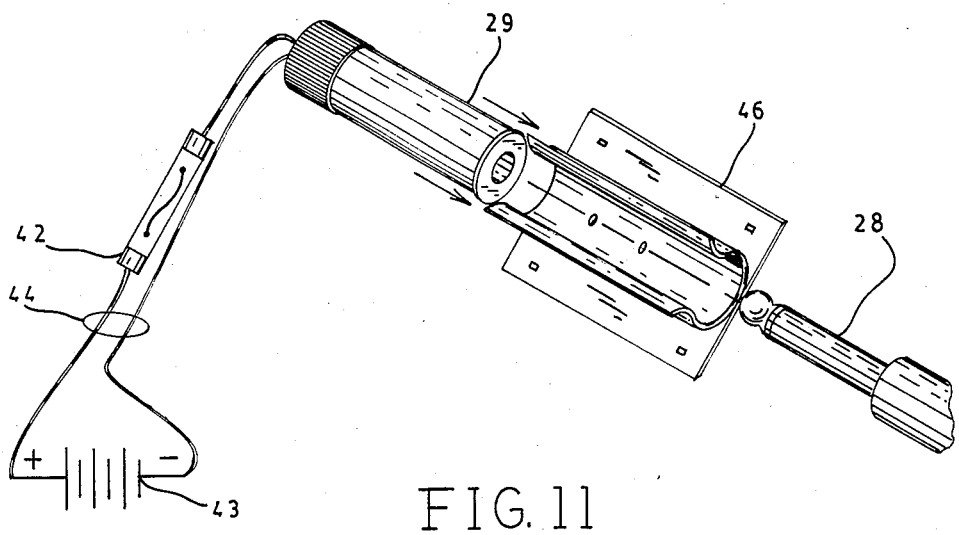
FIG. 11 is a perspective view of the power hook-up showing the power source, wiring with an in-line fuse, female connector and a mount member.
Figure 12:
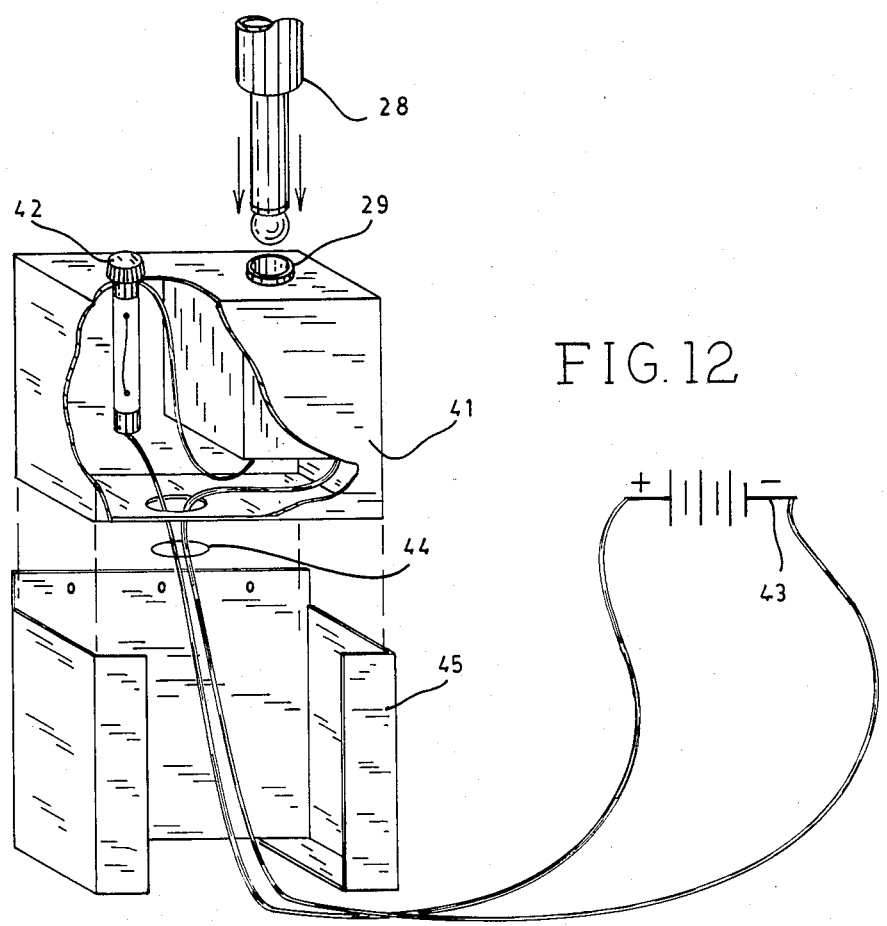
FIG. 12 is a perspective view of the power hook-up in another embodiment with power source, wiring, box unit with fuse and female connector and a mount member.

In FIG. 2 it is depicted that helmet 10 is powered by power-cord 23 with its male connector 28 which will be connected to the female connector 29 of FIG. 11 or 12. Female connector 29 of FIG. 11 is coupled to power source 43 through wiring 44 with an in-line fuse 42. Female connector 29 would then be fixidly attached to vehicle 50 FIG. 13 by mounting bracket 46 which may be attached to motorcycle frame with locking plastic ties or bolted. Female connector 29 in another embodiment FIG. 12 is fixidly attached inside box 41 which houses fuse 42 coupled to power supply 43 by means of wiring 44. Box housing fuse 42 and female connector 29 may be fixidly attached to vehicle 50 by bolting in some appropriate area. In FIG. 13 use of the radar-detection helmet 10 is depicted with hook-up to vehicle 50 by means of power-cord 23 through male connector into female receptacle 29 at below the tank mount 46 or by means of power-cord 23 through male connector into female receptacle at inner fairing mounted box 41 in mount 45.

In FIG. 3 helmet 10 is powered by battery-pack 25 which would be large enough to accomodate batteries to power the electronics incorporated in helmet 10. In this configuration the use of the top and rearward aperture 19 would be benefitial as depicted in FIG. 4 where electronics 13 are housed in top section rearward inside shall 18 and between outer surface area material 14 and inner surface area of shell 18.

Figure 7:
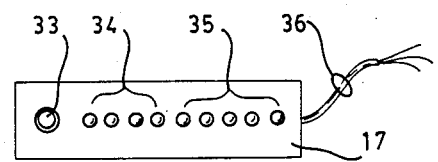
FIG. 7 is a elevational view of the power-on indicator and warning light assembly.
Figure 9:
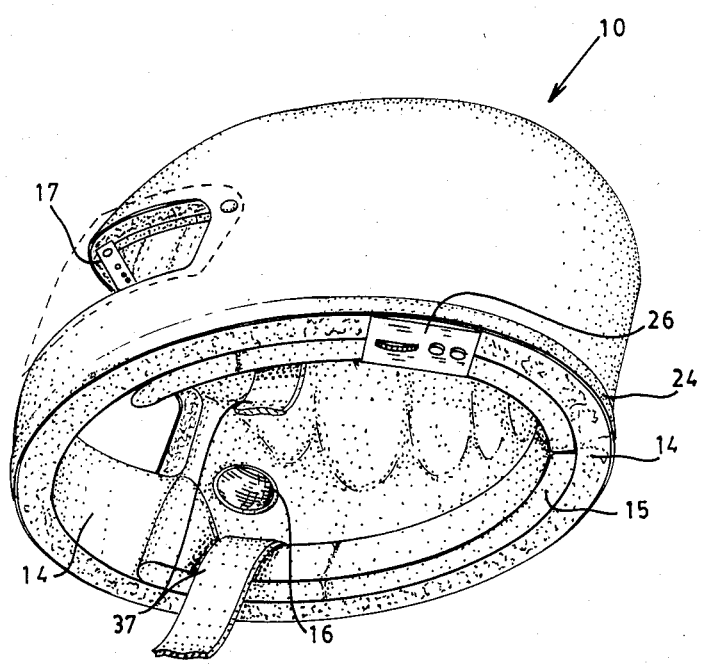
FIG. 9 is a perspective view of the radar-detection helmet of this invention in the design of a full-coverage helmet showing typical locations of controls and warning devices.
Figure 10:
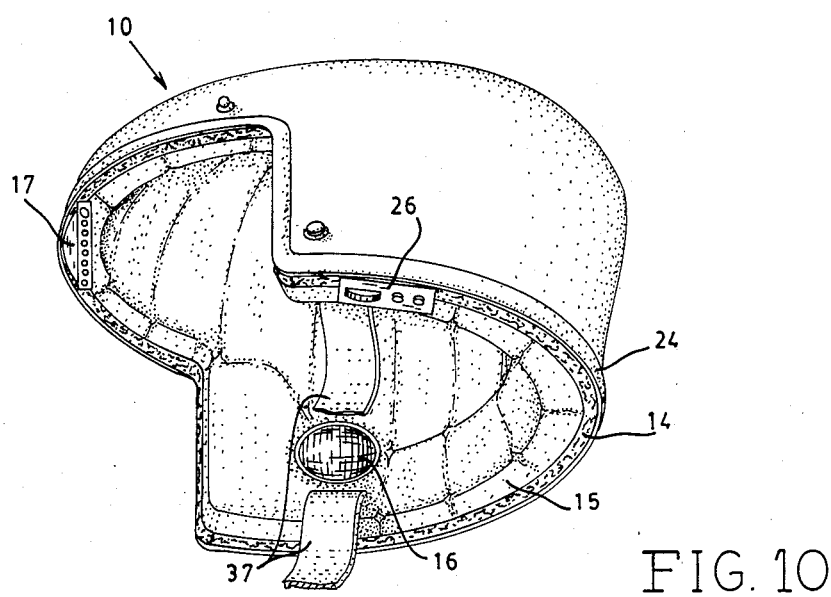
FIG. 10 is a perspective view of the invention in another embodiment as an open-face helmet showing typical locations of controls and warning devices.

In FIG. 7 the light display panel 17 which will be mounted in operator/wearer's vision proximity as depicted in FIGS. 1, 9 and 10 will have a power indicator light 33 which will show that the power is on and capable of handling circuitry. Also panel 17 will house amber lights 34 and red lights 35 that will correlate signal strength of radar being detected. A weak signal will possibly light one or two amber lights while a strong signal may light all the amber lights and all the red lights. The lighting panel 17 is connected to the electronic circuitry 13 FIGS. 1 and 4 through wiring 36. The radio-frequency waveguides 11 and 12 FIG. 1 or the 360 degree antenna 21 FIG. 5 receive the transmitted signals and direct them to the first mixer in the electronics package 13. The signals are filtered and mixed and only the true X and K bands set off the lights and buzzers/earphones. For those versed in the art it would be appreciated that future bands that may be used in radar units would require modifications to the electronics package and that any suitable frequency range may be used.

Figure 8:
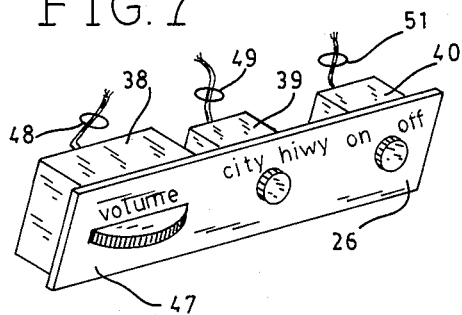
FIG. 8 is a perspective view of the control unit containing the on-off switch, city-highway switch and the volume control of the present invention.
Figure 6:
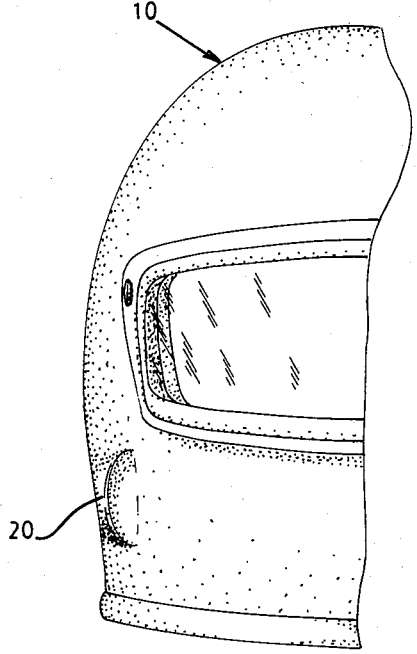
FIG. 6 is a split frontal view of invention of FIG. 5.

Control panel 26 FIG. 8 is made up of plate 47 which may also be formed as a wedge to be attached to side wall 18 and houses volume control switch 38, city/highway switch 39 and on/off switch 40. These are coupled to power cord 23 and to electronics package 13 through wiring 38, 39 and 40 respectfully. Earphones or buzzers 16 FIGS. 9 and 10 will be mounted in ear area of wearer of helmet 10. These will be secondary warning signals to operator/driver that radar is present by developing a beeping sound. They are attached to electronics by means of wiring not shown or numbered.

The helmet 10 may be secured to wearer by the strap and lock mechanism 37 depicted in FIGS. 9 and 10. For those skilled in the art it may be noted that other suitable means may be employed.

Of course, based on the same inventive idea, many changes and modifications may be made without departing from the scope of the invention.

Futhermore the material and dimensions used may be any selected ones to meet individual requirements.

I claim:

1. A safety helmet for use by an operator of a motorcycle or like sports vehicle, said helmet for providing to said operator a warning of radar signals, said helmet comprising:

an impact resistant helmet shell to provide safety protection to said operator, said shell having a forward portion defining a face opening surrounding the face of said operator, a rearward portion, a top portion and opposite side portions, said shell having a peripheral edge;

at least one radar signal receiving means for receiving said radar signals mounted within at least said forward portion of said shell;

a radar signal detection circuit connected to said receiving means and mounted within said shell, said detection circuit providing an output signal corresponding to a detection of said radar signals by said receiving means;

visual indicator means mounted within said shell proximate said face opening within view of eyes of said operator, said visual indicator means connected with said signal detection circuit, said indicator means visually displaying information to said operator as to said output signal of said detection circuit; and padding material encasing said at least one radar signal receiving means and said detection circuit, said padding substantially conforming on one surface with an inner surface of said shell, and substantially conforming on an opposite surface to the head of said operator, said padding extending substantially to said peripheral edge of said shell.

2. The safety helmet of claim 1 further comprising audible indicator means mounted within said padding of said shell proximate said side portions of said shell to be proximate ears of said operator, said audible indicator means being connected to said detection circuit whereby output signals from said detection circuit provide audible signals to said operator of the presence of said radar signals.

3. The safety helmet of claim 1 wherein said radar signal receiving means is a wave guide in said forward portion of said shell and a further wave guide connected to said detection circuit mounted within said padding in said rearward portion of said shell for receiving said radar signals.

4. The safety helmet of claim 1 wherein said radar receiving means is a 360 degree radar antenna mounted within said top portion of said shell and extending to said forward portion, said antenna connected to said signal detection circuit.

5. The safety helmet of claim 1 wherein said signal detection circuit is provided with: first switching means for activating said circuit; second switching means for selecting sensitivity of said circuit to radar signal strengths in selected environments; volume control means; and a source of voltage for operating said circuit.

6. The safety helmet of claim 5 wherein said source of voltage is a battery, said battery and said circuit being positioned within said padding of said shell proximate said rearward portion; and wherein said first and second switching means are positioned within said padding proximate said peripheral edge of said shell for activation by said operator.

7. The safety helmet of claim 1 wherein said visual indicator means is a plurality of lamps illuminated as a function of output signal strength of said detection circuit, the number and color of said lamps providing to said operator an indication of strength of said radar signals.

8. The safety helmet of claim 1 wherein said shell is provided with inlet openings in said side portions and with ducts within said padding whereby air entering said openings flows through said ducts thereby cooling the interior of said helmet.

9. The safety helmet of claim 1 wherein said face opening is closed with a transparent window to give full face protection to said operator.

10. A safety helmet for use by an operator of a motorcycle or like sports vehicle, said helmet for providing to said operator a warning of radar signals, said helmet comprising:

an impact resistant helmet shell to provide safety protection for the head of said operator, said shell having a forward portion defining a face opening surrounding the face of said operator, a rearward portion and opposite side portions, said shell having a peripheral edge;

at least one radar signal receiving means for receiving said radar signals mounted within at least said forward portion of said shell, said radar signal receiving means being a wave guide antenna;

a radar signal detection circuit connected to said antenna and mounted within said shell proximate said rearward portion, said detection circuit providing an output signal corresponding to a detection of said radar signals;

padding material encasing said wave guide antenna and said detection circuit, said padding substantially conforming on one surface with an inner surface of said shell, and substantially conforming on an opposite surface to said head of said operator, said padding extending substantially to said peripheral edge of said shell;

indicator lamps mounted within said padding in said shell proximate said face opening within view of eyes of said operator, said lamps connected to said detection circuit whereby selected of said lamps are illuminated for selected strengths of said output signal of said circuit;

a control panel connected to said detection circuit and mounted within said padding proximate said peripheral edge of said shell for activation by said operator, said control panel including first switching means for activating said detection circuit, second switching means for selecting sensitivity of said detection circuit to radar signal strengths in selected environments, and a volume control means for regulating volume of said output signal; and power source means connected to said detection circuit through said control panel.

11. The safety helmet of claim 10 further comprising audible indicator means mounted within said padding of said shell proximate side portions of said shell to be proximate ears of said operator, said audible indicator means being connected to said detection circuit whereby output signals from said detection circuit provide audible signals to said operator.

12. The safety helmet of claim 10 wherein said shell is provided with inlet openings in said side portions and with ducts within said padding whereby air entering said openings flows through said ducts thereby cooling the interior of said helmet.

13. The safety helmet of claim 10 wherein said face opening is closed with a transparent window to give full face protection to said operator.

* * * * *